United States Patent
Bajaj (10) Patent No.: US 12,468,617 B1
(45) Date of Patent: Nov. 11, 2025

(54) OPERATIONAL ANALYSIS FOR MACHINE LEARNING MODEL

(71) Applicant: Amazon Technologies, Inc., Seattle, WA (US)

(72) Inventor: Harsh P. Bajaj, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1156 days.

(21) Appl. No.: 17/328,661

(22) Filed: May 24, 2021

(51) Int. Cl.
*G06N 20/00* (2019.01)
*G06F 11/34* (2006.01)

(52) U.S. Cl.
CPC ...... *G06F 11/3414* (2013.01); *G06F 11/3428* (2013.01); *G06N 20/00* (2019.01)

(58) Field of Classification Search
CPC .. G06F 11/3414; G06F 11/3428; G06N 20/00
See application file for complete search history.

(56) References Cited

U.S. PATENT DOCUMENTS

| | | | | |
|---|---|---|---|---|
| 7,721,061 | B1* | 5/2010 | Kelly | G06F 11/3447 709/224 |
| 10,209,974 | B1* | 2/2019 | Patton | G06F 8/60 |
| 10,348,814 | B1* | 7/2019 | Golden | G06F 3/0652 |
| 10,353,685 | B2* | 7/2019 | Patton | G06F 8/60 |
| 10,355,922 | B1* | 7/2019 | Stienhans | H04L 43/55 |
| 10,606,736 | B1* | 3/2020 | Gardner | G06F 11/3495 |
| 10,671,508 | B2* | 6/2020 | Gopu | G06F 11/3433 |
| 2014/0068546 | A1* | 3/2014 | Balasubramanian | G06F 8/61 717/104 |
| 2015/0378875 | A1* | 12/2015 | Sivanesan | G06F 11/3684 717/124 |
| 2016/0364797 | A1* | 12/2016 | Onallah | G06Q 40/04 |
| 2017/0315902 | A1* | 11/2017 | Moretto | G06F 11/3688 |
| 2019/0171428 | A1* | 6/2019 | Patton | G06F 8/60 |
| 2020/0012962 | A1* | 1/2020 | Dent | G06F 9/5011 |
| 2020/0193221 | A1* | 6/2020 | Aftab | G06N 3/08 |
| 2021/0042570 | A1* | 2/2021 | Iskandar | G06F 18/285 |
| 2021/0152455 | A1* | 5/2021 | Castle | H04L 43/0876 |
| 2021/0273959 | A1* | 9/2021 | Salji | G06F 21/554 |

(Continued)

FOREIGN PATENT DOCUMENTS

| | | | | |
|---|---|---|---|---|
| CN | 108170909 A | * | 6/2018 | G06F 30/00 |
| CN | 110598446 A | * | 12/2019 | G06F 11/3409 |

(Continued)

OTHER PUBLICATIONS

Simon Chan, etc., "PredictionIO: A Distributed Machine Learning Server for Practical Software Development", published via CIKM '13, Oct. 27-Nov. 1, 2013, San Francisco, CA, USA, p. 2493 onwards, retrieved Sep. 4, 2024. (Year: 2013).*

(Continued)

*Primary Examiner* — Shourjo Dasgupta
(74) *Attorney, Agent, or Firm* — BakerHostetler (57) ABSTRACT

Implementations for providing event processing services test and deploy machine learning models described. Events associated with an application may be stored and replayed to a machine learning model. Operational metrics associated with the replaying of the events may be measured and stored for analysis and display. The machine learning model may be deployed after determining the operational metrics.

20 Claims, 7 Drawing Sheets

(56) References Cited

U.S. PATENT DOCUMENTS

| | | | | |
|---|---|---|---|---|
| 2021/0405984 | A1* | 12/2021 | Agarwal | G06F 11/3409 |
| 2022/0067573 | A1* | 3/2022 | Munguia Tapia | G06F 11/3495 |
| 2024/0127159 | A1* | 4/2024 | Chellappa | G06Q 10/067 |

FOREIGN PATENT DOCUMENTS

| | | | | |
|---|---|---|---|---|
| CN | 111949521 | A * | 11/2020 | G06F 11/3688 |
| CN | 112000459 | A * | 11/2020 | G06N 20/00 |
| CN | 112651785 | A * | 4/2021 | G06Q 30/0202 |
| JP | 2012146015 | A * | 8/2012 | |

OTHER PUBLICATIONS

The Full Stack, "Lecture 11: Deployment & Monitoring", published on Apr. 12, 2021 to https://fullstackdeeplearning.com/spring2021/lecture-11, retrieved Jun. 4, 2025. (Year: 2021).*

"MLOps Principles", published on Jun. 30, 2020 to https://ml-ops.org/content/mlops-principles, retrieved Jun. 4, 2025. (Year: 2020).*

Ermao Cai, etc., "NeuralPower: Predict and Deploy Energy-Efficient Convolutional Neural Networks", published via Proceedings of Machine Learning Research, vol. 77, pp. 622-637, year 2017, retrieved Jun. 4, 2025 from https://proceedings.mlr.press/v77/cai17a/cai17a.pdf. (Year: 2017).*

Guoxin Su, etc., "Reliability of Run-Time Quality-of-Service Evaluation Using Parametric Model Checking", published via 2016 IEEE/ACM 38th International Conference on Software Engineering (ICSE) (2016, pp. 73-84), retrieved Jul. 12, 2025. (Year: 2016).*

Giuliano Casale, etc., "Dealing with Burstiness in Multi-Tier Applications: Models and Their Parameterization", published via IEEE Transactions on Software Engineering, vol. 38, No. 5, Sep./Oct. 2012, retrieved Jul. 12, 2025. (Year: 2012).*

Giuliano Casale, etc., "BURN: Enabling Workload Burstiness in Customized Service Benchmarks", published in IEEE Transactions on Software Engineering, vol. 38, No. 4, Jul./Aug. 2012, retrieved Jul. 12, 2025. (Year: 2012).*

Feifei Chen, etc., "Automating Performance and Energy Consumption Analysis for Cloud Applications", published via 2015 IEEE World Congress on Services (2015, pp. 63-70), retrieved Jul. 12, 2025. (Year: 2015).*

Carlos H.G. Ferreira, etc., "PEESOS-Cloud: a workload-aware architecture for performance evaluation in service-oriented systems", published via 2016 IEEE World Congress on Services (Services) (2016, pp. 118-125), retrieved Jul. 12, 2025. (Year: 2016).*

Ruoyu Gao, etc., "An Exploratory Study on Assessing the Impact of Environment Variations on the Results of Load Tests", published via 2017 IEEE/ACM 14th International Conference on Mining Software Repositories (MSR) (2017, pp. 379-390), retrieved Jul. 12, 2025. (Year: 2017).*

Jason Brownlee, "Deploy Your Predictive Model To Production", published on May 18, 2021 to https://machinelearningmastery.com/deploy-machine-learning-model-to-production, retrieved Jul. 12, 2025. (Year: 2021).*

* cited by examiner

OPERATIONAL ANALYSIS FOR MACHINE LEARNING MODEL

BACKGROUND

Machine learning models are trained and used for providing a variety of services. These models, however, can be difficult to analyze prior to deployment in a system in which it is integrated. Some systems may process high amounts of events and must meet certain standards to prevent the system from destabilizing. Current techniques do not provide approaches that allow for sufficient analysis of a machine learning model in the context of a production based system.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Disclosed herein are techniques that allow a machine learning model to be tested and evaluated before the model is put into production and faces customer traffic. The machine learning model may be integrated with a system to provide classification decisions, such as decisions related to a user sign-in process that authenticates users attempting to sign in to a web service.

A machine learning model may be uploaded to or otherwise created by a network based service, such as a web service. The machine learning model may be configured to process events associated with the service. A user may cause events associated with the service to be stored for later or concurrent testing of the machine learning model. Testing operation parameters may be input, such as a predefined transaction rate, transaction pattern, and/or transaction algorithm. The testing operation parameters may be applied to the event data (e.g., or to modify or generate event data) to replay the event data to the machine learning model.

Operational metrics may be measured and determined associated with replaying the event data to the machine learning model. The operational metrics may indicate system performance information, such as usage information, resource usage information, timing information (e.g., day), system analysis information, bandwidth information, and efficiency information. Example operational metrics include latency, throughput, number of invocations of the machine learning model 118, number of errors, types of errors, availability (e.g., availability of the machine learning services and/or other resources), or a combination thereof. The operational metrics may be displayed and/or used to trigger a change in a configuration of the machine learning model, such as deploying the machine learning model in production, reverting to a prior configuration, changing a parameter of a testing operation (e.g. transaction rate, data size, replay pattern) and/or the like. A user may set alarms and/or other triggering conditions to trigger the change. A triggering condition may be reaching a threshold for one or more operational metrics. If an operational metric goes above or below a corresponding threshold, the change may be caused and/or any other action may be performed, such as sending a notification.

Figure 1:
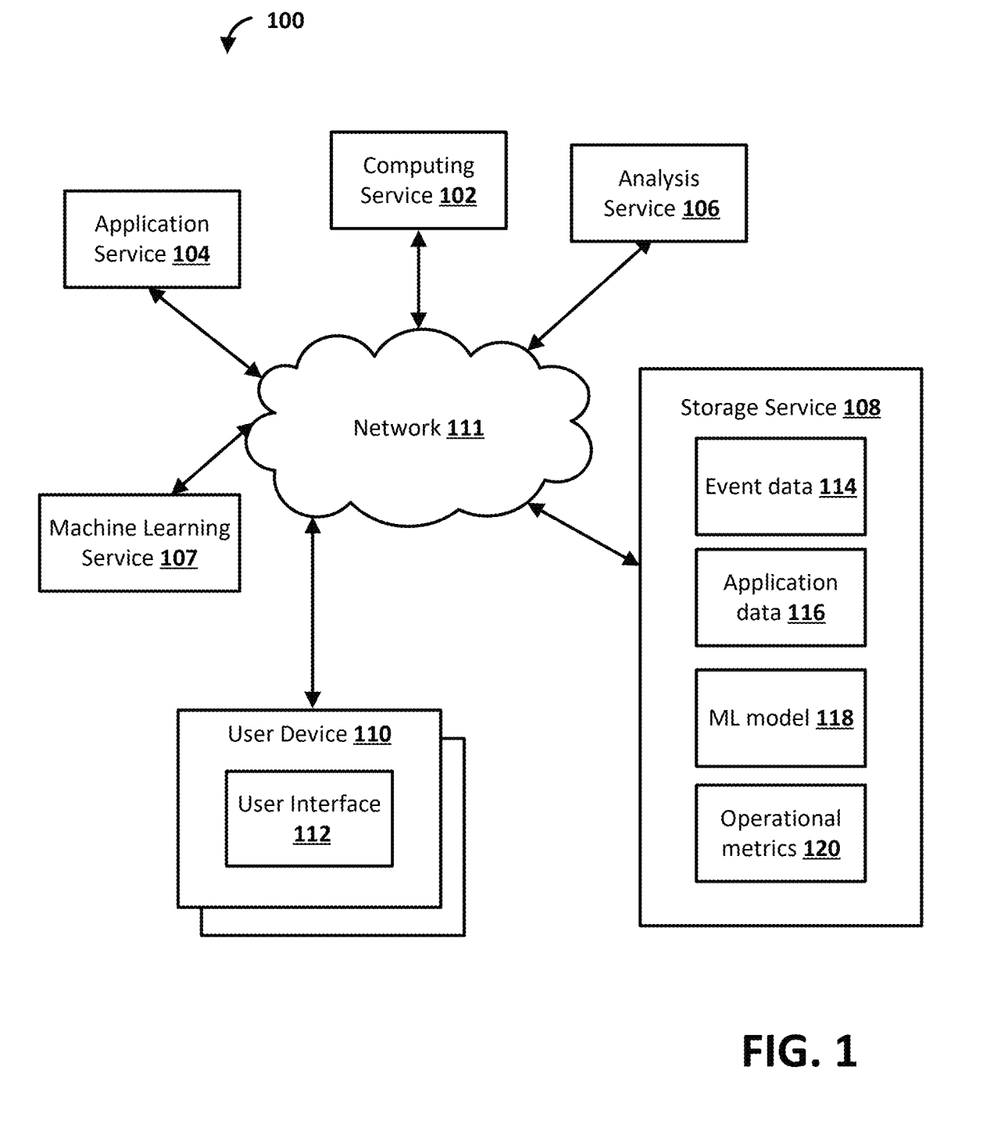
FIG. 1 is a diagram illustrating an example computing system for managing a machine learning model.

FIG. 1 is a diagram illustrating an example computing system 100 for providing one or more services. The one or more services may comprise a computing service 102, an application service 104, an analysis service 106, a machine learning service 107, a storage service 108, or a combination thereof. The one or more services may be accessible via a services user interface, such as a web-based services user interface. The services user interface may allow users to configure, sign-up, manage, and/or the like the one or more services. The services user interface may be configured to allow association and/or integration of one service with another. The one or more services and/or the services user interface may be managed by a services entity, such as a services provider. The one or more services may comprise network-based services that are geographically dispersed (e.g., external to user premises). The one or more services may be provided to one or more user devices 110.

The system 100 comprises a network 111. The network 111 is configured to communicatively couple one or more of the computing service 102, the application service 104, the analysis service 106, the machine learning service 107, the storage service 108, the user device 110, and/or the like. The network 111 may also comprise a plurality of network devices, such as routers, switches, access points, switches, hubs, repeaters, modems, gateways, and/or the like. The network 111 may comprise wireless links, wired links, a combination thereof, and/or the like.

The one or more user devices 110 comprise a computing device, such as a mobile device, a smart device (e.g., smart watch, smart glasses, smart phone), a computing station, a laptop, a workstation, a tablet device, and/or the like. In embodiments, the one or more user devices 110 are configured to output one or more user interfaces 112, such as a user interface associated with the computing service 102, a user interface associated with the application service 104, a user interface associated with the analysis service 106, a user interface associated with the machine learning service 107, a user interface associated with the storage service 108, and/or the like. The one or more user interfaces are output by an application, such as desktop application, a mobile application, a browser application, a content browser, a web browser, and/or the like.

The computing service 102 is configured to provide one or more computing nodes, such as computer processors, virtual machines, computing devices, and/or the like. The computing service 102 may be used to implement a variety of services, such as any of the one or more services, a web hosting service, a database service, cloud computing services, analytic services, blockchain services, application programming interface services, developer services, machine learning services, security services, serverless hosting, business application services, gaming services, content services, and/or the like.

The storage service 108 is configured to store event data 114. The event data 114 comprises data indicative of events generated by the one or more services. The event data 114 may be generated based on the one or more services. The events may be generated based on monitoring for events, requests received by the services, actions performed by the one or more services, and/or the like. The events may be events from one or more service logs, data streams, and/or the like. In embodiments, the event data 114 comprises events associated with the application service 104. The application service 104 is a service that provides an application. The application may comprise a web-application. The application service 104 may be an application hosted on a serverless web hosting service (e.g., the web server software is managed on behalf a user). The user may upload the application to the storage service 108 as application data 116 (e.g., application code sets, application packages). The application service 104 provides the application based on the application data 116.

The machine learning service 107 is configured to provide one or more machine learning models as a service. The one or more machine learning models may be stored in the storage service 108. The machine learning service 107 may allow users to create, upload, modify, train, and/or the like a machine learning model 118. For example, a user may upload the machine learning model 118 using a user interface. In embodiments, the machine learning service 107 allows users to input and/or send data configuring a machine learning model 118. The data configuring the machine learning model may associate a machine learning model 118 with a service endpoint, such as a location and/or service that when accessed, causes the machine learning model 118 to execute. The machine learning service 107 may allow the machine learning model 118 to be deployed according to different production modes, such as a non-production mode (e.g., pre-production mode, developer mode, testing mode, private mode) or a production mode (e.g., public mode). A machine learning model 118 may initially be configured to be in the non-production mode. After non-production mode, the machine learning model 118 may be deployed in production in a temporary testing mode (e.g., "baking" the model). The temporary testing mode may be a mode in which the machine learning model 118 is monitored closely in production. If errors arise, such as operational metrics being above or below a threshold, the machine learning model 118 may be reverted back to non-production. In some scenarios, the temporary testing mode may send only a portion of events from production to the machine learning model. If a time period associated with temporary testing mode expires, the machine learning model 118 may be deployed to a regular production mode.

The analysis service 106 is configured to perform analysis of one or more of the services, such as the application service 104, the machine learning service 107, the storage service 108, the computing service 102, and/or the like. The analysis service 106 is configured to determine (e.g., generate) operational metrics 120 associated with the one or more services. In embodiments, the operational metrics may be associated with the machine learning model 118 of the machine learning service 107 (e.g., and any related services, used to provide the machine learning service 107). The operational metrics 120 may be stored in the storage service 108.

The operational metrics 120 indicate system performance information. The system performance information may comprise system usage information, resource usage information, timing information (e.g., day), bandwidth information, efficiency information. The system performance information may comprise system performance information associated with processing events and/or other data by the machine learning model 118. The machine learning model 118 may be configured to process the events and/or data to determine a result, such as classification of the events and/or data. The machine learning model 118 may be configured to receive event characteristics associated with a corresponding event and determine, based on the event characteristics, a classification of the event. As part of processing the events, various processes may be used, such as transmitting data between services, using processing resources, using storage resources, power consumption, and/or the like. This information may be measured as operational metrics 120.

In embodiments, the operational metrics 120 comprise latency, throughput, number of invocations of the machine learning model 118, number of errors, types of errors, availability (e.g., availability of the machine learning services and/or other resources), durability, or a combination thereof. The operational metrics 120 may comprise latency (time) for application service 106 to receive a response from the machine learning model 118, latency as measured from the machine learning service 107 (e.g., overhead latency, latency of the machine learning model from input time to output time), or a combination thereof. The operational metrics 120 may comprise exceptions or invocation failures, invocation errors (e.g., Invocation4XX), timeouts that occurred during the call to machine learning service 107. The operational metrics may comprise health metrics of a thread pool (e.g., maximum threads, number of busy threads, etc.). The operational metrics may comprise an indication of durability, such as an indication of whether a transaction was processed by the machine learning model 118, an indication of the number of transactions processed by the machine learning model 118, an indication of whether a response of the machine learning model 118 is valid, an indication of a number of responses of the machine learning model 118 that were valid, an indication of a number of responses of the machine learning model 118 that were invalid, a combination thereof, and/or the like. The operational metrics may comprise an indication of failure recovery (e.g., fault tolerance, error recovery statistics, time to recover from an error, average time to recover an error) for one or more of the machine learning service 107, the machine learning model 118, or the application service.

In embodiments, the analysis service 106 is configured to determine accuracy metrics. The accuracy metrics may comprise a measurement of accuracy of the results (e.g., classifications) of the machine learning model 118. The accuracy metrics may be based on a comparison of the results to pre-defined classification results (e.g., labeled by a user), results of a heuristic rule process, and/or results of another machine learning model. The accuracy metrics may be combined with, displayed with, and/or analyzed with the operational metrics. The accuracy metrics may be associated with corresponding triggering conditions to trigger actions in a manner similar to the operational metrics. The accuracy metric may be based on area under the curve (AUC) scores of the machine learning model 118, such as an area under a receiver operating characteristic curve. The output of the machine learning model 118, such as an anomaly score, may be stored and used to determine to AUC scores for the machine learning model. An AUC score being above or below a threshold may trigger one or more of an alarm, changing between production mode and non-production mode, changing a test operation parameter, and/or the like.

The analysis service 106 is configured to analyze performance of a machine learning model 118 while the machine learning model 118 is in a non-production mode. During non-production mode, the machine learning model 118 is not used to process events for responding to customer interactions with the application service 104. In embodiments, the analysis service 106 is configured to perform a testing operation on the machine learning model 118. The analysis service 106 may be configured to receive a specified transaction rate (e.g., or event rate, rate of sending requests to process events to the machine learning model 118 associated with the testing operation). The specified transaction rate may be a user specified transaction rate. In some scenarios, the transaction rate may be based on a transaction rate associated with the application service, and/or a prior benchmark (e.g., current machine learning model, a heuristic rule based process). As part of the testing operation (e.g., or an initial configuration process), an association between the machine learning model 118 and a plurality of events may be received. The plurality of events may comprise prior events associated with the application service 104. The application service 104 may be configured to store the events as event data as the events occur in operation of the application service 104. The plurality of prior events may be events associated with different users, different request, and/or the like.

The analysis service 106 may be configured to replay (e.g., or send), according to a specified transaction rate, the plurality of prior events of the stored data to the machine learning model 118 (e.g., and the machine learning service 107). The prior events may be replayed according to a time order of the prior events. Additionally or alternatively, the analysis service 106 may cause fake events to be generated according to a pattern. The pattern may be based on prior events and/or generated based on an algorithm. The analysis service 106 may omit events and/or duplicate events in the event data 114 to ensure that the transaction rate is met. The operational metrics 120 may indicate system usage in replaying the plurality of prior events.

In embodiments, the machine learning model 118 is associated with a service endpoint. The service endpoint may comprise a location (e.g., uniform resource identifier) and/or a computing service (e.g., a virtual machine, computing node, and/or the like of the computing service) associated with executing requests sent to the location. In embodiments, the service endpoint causes the machine learning model 118 to execute the plurality of prior events based on the specified transaction rate. The service endpoint may comprise a serverless web service configured with application code. If the machine learning model 118 is in production mode, requests from the application service 104 to process events may be sent to the service endpoint, which may forward the requests to the machine learning service 107 (e.g., which may cause the machine learning model 118 to process the request/event).

The analysis service 106 is configured to display the operational metrics 120 to a user via a user interface, such as a user interface configured to manage one or more the machine learning models. The operational metrics 120 may be displayed with benchmark information, such as operational metrics 120 associated with another machine learning model. The analysis service 106 is configured to analyze the performance of the machine learning model 118. In embodiment, analyzing the performance comprises comparing one or more of the operational metrics 120 or results of the machine learning model 118 with the benchmark information. The other machine learning model may be a machine learning model currently being used in production mode. The benchmark information may comprise operational metrics 120 associated with a heuristic rule based process configured to perform the same function (e.g., classifying events) as the machine learning model 118.

The user interface associated with the analysis service 106 may allow users to navigate to a specific time-zone, region (e.g., computing region), group, and/or the like to display a corresponding portion of the operational metrics. The operational metrics may be displayed as a graphical element, such as chart, graph, and/or the like. The user may select a portion of the graphical element and/or other displayed information to view a subset of a data set (e.g., application logs, data logs) upon which the graphical element is based. The subset may be selected based on timestamp, region, a combination thereof, and/or the like. The user interface may show comparisons of data, such as comparisons of current and prior operational metrics, comparisons of operational metrics and benchmark information, and/or the like.

In embodiments, the machine learning model 118 is deployed in production mode after determining the operational metrics 120. In some scenarios, the analysis service 106 may compare the operational metrics 120 to one or more deployment conditions (e.g., a threshold and/or range for one or more of the operational metrics). If the operational metrics 120 satisfy the deployment conditions, then the analysis service 106 may cause the machine learning model 118 to be deployed in production mode. In other scenarios, the user may provide instructions to deploy the machine learning model 118 in production mode (e.g., after reviewing the operational metrics).

The analysis service 106 may continue to determine operational metrics 120 associated with the machine learning model 118 while the machine learning model 118 is in production mode. In embodiments, the analysis service 106 is configured to detect one or more triggering condition associated with the operational metrics 120. The analysis service 106 may be configured to cause based on the one or more triggering condition, an action, such as sending of a notification, changing a configuration of the machine learning model 118, and/or the like. Changing the configuration of the machine learning model 118 may comprise changing the machine learning model from a production mode to a non-production mode, reverting to a prior configuration before the machine learning model 118 was deployed, a combination thereof, and/or the like.

Figure 2A:
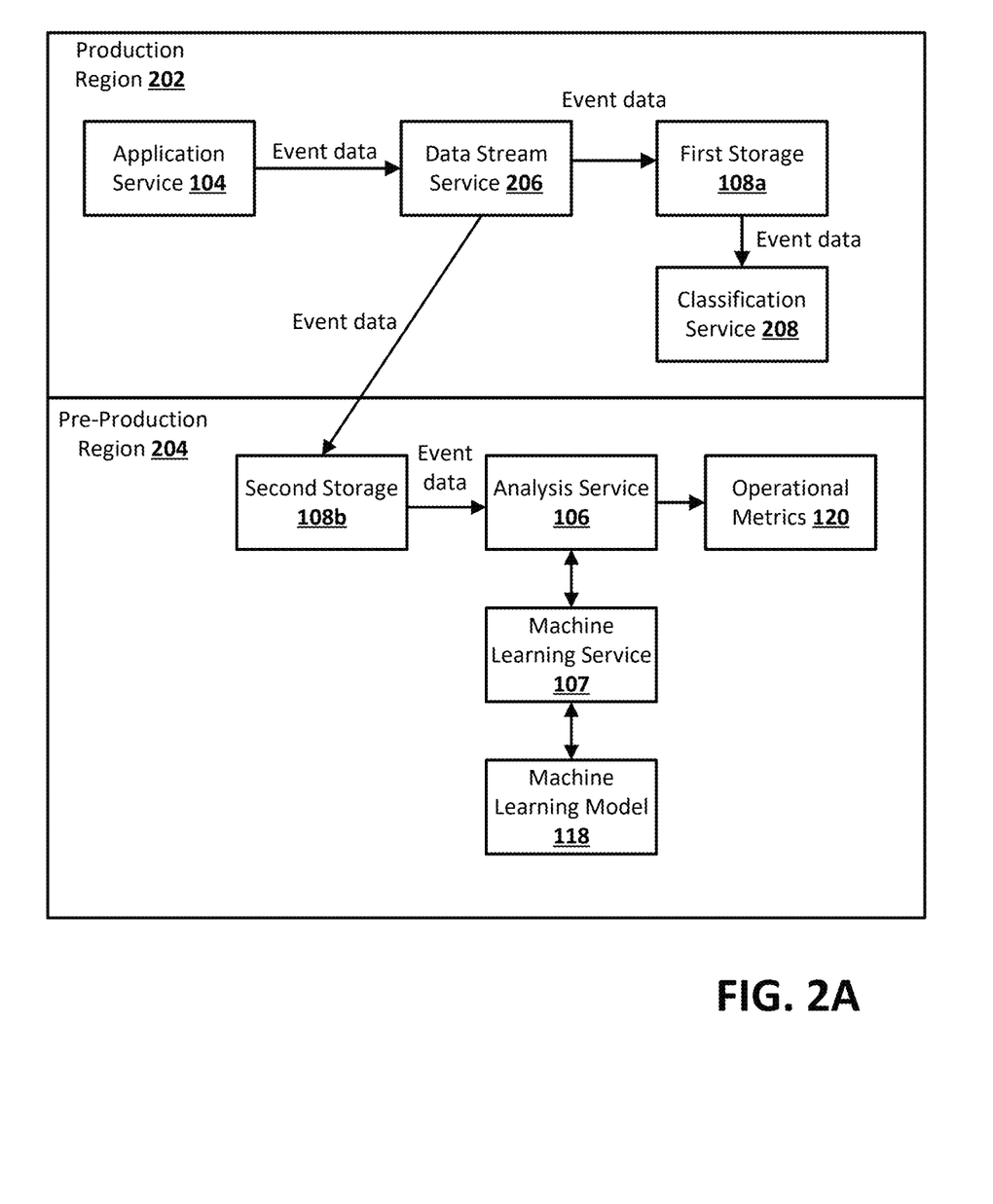
FIG. 2A is a diagram showing an example process for managing a machine learning model.

FIG. 2A is a diagram showing an example process for managing a machine learning model. In embodiments, the machine learning model is trained to provide an anomaly decision associated with a sign-in event. Event characteristics associated with the user attempting to sign in to the service may be sent to the machine learning model, which may classify the sign-in event as anomalous or non-anomalous (e.g., or provide an anomaly score). When deployed in production to classify customer traffic in real time, an anomalous result may trigger the sign-in service to provide an additional challenge (e.g., a multi-factor authentication challenge) and/or request for more information.

As shown in FIG. 2A, the application service 104 may be deployed in a production region 202. The machine learning model 118 may be initially provided in a pre-production region 204 (e.g., or testing phase). In the pre-production region 204, the machine learning model 118 may function in a shadow mode and/or be used for A/B testing. In shadow mode, the machine learning model makes decisions based on sign-in events, but these decisions are not reported to the application service 104.

The machine learning model 118 may be used as a service integrated with the application service 104 (e.g., when deployed in the production region 202). For example, the application service 104 may provide requests to the machine learning model 118 to process requests provided to the application service. Thus, performance of the machine learning model 118 may affect the performance of the application service 104. To evaluate the effect of the integrating the machine learning model 118 with the application service 104, a data stream service 206 may be used to send the event data to different regions. The data stream service 206 may receive event data from the application service 104, such as sign-in requests and associated characteristics. The data stream service 206 may send a copy of the event data to first storage 108a and another copy of the event data to the second storage 108b. The first storage 108a and the second storage 108b may comprise different storage accounts managed by a single storage service, such as storage service 108. The first storage 108a may be storage used for production region 202 activities, such as activities provided by the classification service 208. The classification service 208 may be configured to classify events, such as sign-in requests, as anomalous or non-anomalous (e.g., or provide an anomaly score). The resulting classifications may be sent to the application service 104 for further processing of user sign-in events. In embodiments, the classification service 208 comprises another machine learning model (e.g., previously trained and/or deployed), a heuristic rule based model, a combination thereof, and/or the like.

In the pre-production region 204, the event data stored in the second storage 108b is accessed by the analysis service 106 to perform a testing operation. The analysis service 106 receives (e.g., via user input) testing operation instructions, such as a transaction rate to replay the event data, a criteria for selecting all or a portion of the event data (e.g., time window, location, region). In embodiments, the analysis service 106 replays the event data to the machine learning model by sending events in a sequence according to the transaction rate to the machine learning service 107. The machine learning service 107 sends the event data (e.g., according to the sequence, transaction rate) as input to the machine learning model 118. The analysis service 106 may send each event with one or more event attributes, such as sign-in attributes from the second storage 108b. The analysis service 106 obtains operational metrics associated with replaying the event data and stores in the operational metrics 120 for later display and analysis.

This strategy allows for analyzing how the machine learning model will function if deployed in production mode. In some scenarios, the usage of the data stream service 206 allows for event data to be sent to the pre-production region 204 and analyzed by the machine learning model 118 at the same time (e.g., or according to the at which events arrive at the first storage 108a and second storage 108b) that the classification service 208 is operating to classify events. The classification service 208 and the machine learning model 118 may be analyzed simultaneously and operational metrics may be displayed along side each other for comparison.

In embodiments, the machine learning model 118 may be configured as a "canary" in which a subset of the event data is sent (e.g., as the events are generated by the application service 104) to the second storage 108b and processed (e.g., as the events are received due to customer requests) by the machine learning model 118. The remaining portion may be sent to the classification service for processing. The data stream service 206 may select the subset of events according to any appropriate criterion.

Figure 2B:
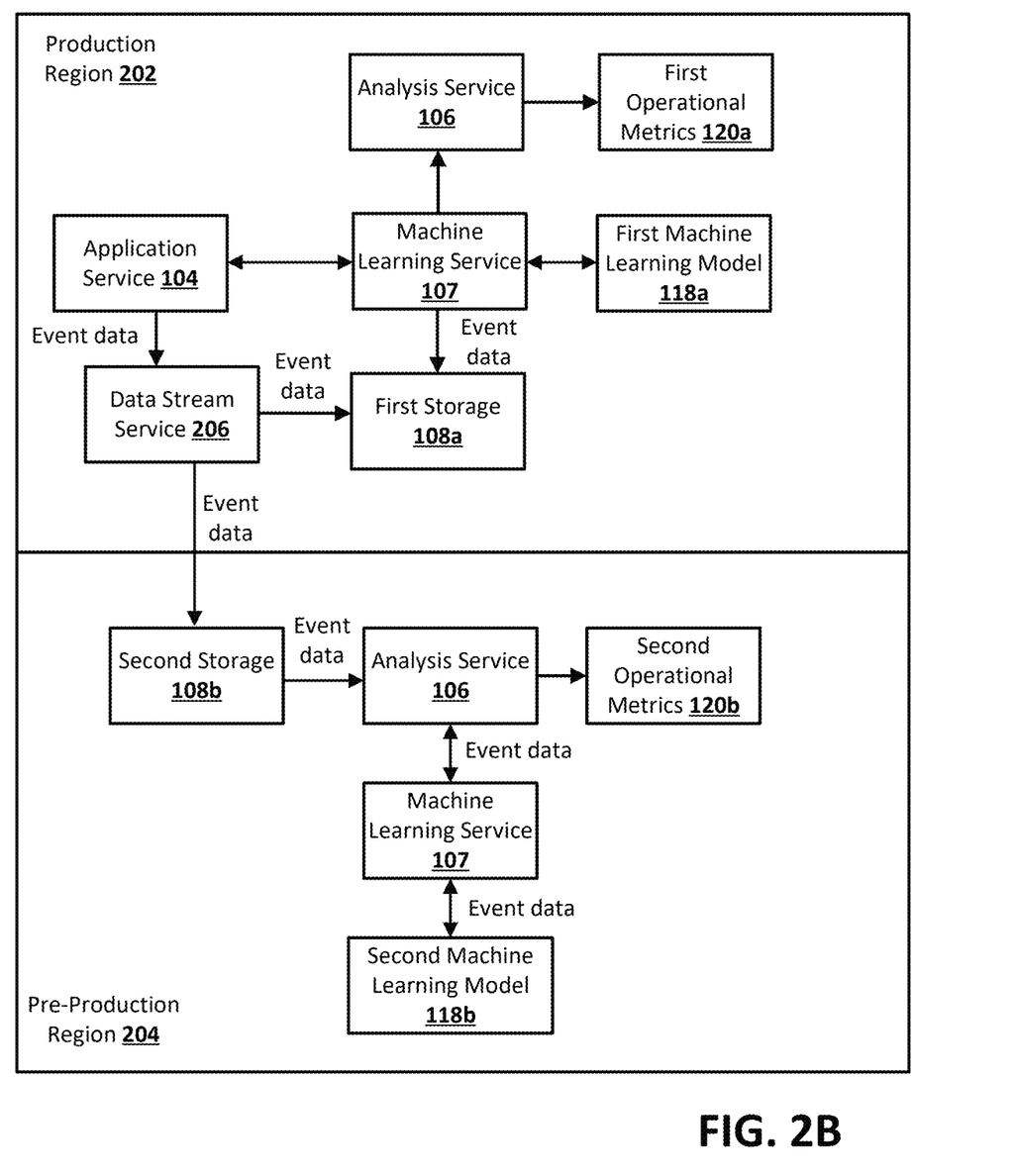
FIG. 2B is another diagram showing an example process for managing a machine learning model.

FIG. 2B is a diagram showing an example process for managing a machine learning model. In embodiments, the machine learning model 118 of FIG. 2A may be deployed in the production region as the first machine learning model 118b. The machine learning service 107 receives requests directly from the application service 104 and/or via receiving event data in the first storage 108a. The machine learning service 108 causes the event data (e.g., from real time customer traffic) to be input to the first machine learning model 118a. The first machine learning model 118a may provide classification results (e.g., anomaly score), which the machine learning service 107 may return to the application service 104. The application service 104 may use the result (e.g., anomalous, non-anomalous, anomaly score) to evaluate which action to perform next. The analysis service 106 may continue to monitor the first machine learning model 118a and generate first operational metrics 120a associated with executing the first machine learning model 118a in production mode. The results may be stored for later comparison.

In some scenarios, a user may determine to train a second machine learning model 118b. Overtime, due to drift and other factors, the first machine learning model 118a may become less accurate. The first operational metrics 118a and/or accuracy metrics may be used to trigger a notification indicating the accuracy and/or performance is degraded below a threshold. In embodiments, if a triggering condition is detected, the first machine learning model 118 may automatically be removed from the production region 202. A user may set various triggers and/or alarms related to exceptions, faults, latency, a combination thereof, and/or the like. As an example, if a threshold number of exceptions are determined in the first operational metrics 118a, then the first machine learning model 118 may be removed from the production region 202. If a threshold amount of latency is determined in the first operational metrics 118, then the first machine learning model 118 may be removed from the production region 202. In another scenario, an alarm and/or notification may be sent, caused, and/or output if the threshold is met.

The second storage 108 may receive the event data from the data stream service 206. The event data may be accessed by the application service 106, which may cause the events to be replayed or played in real time to the second machine learning model 118b, thereby generating second operational metrics 120b in the same manner as described for FIG. 2A and elsewhere herein. The analysis service 106 may also store the classification results of the second machine learning model 118b. The analysis service 106 may compare the classification results (e.g., first anomaly score) of the second machine learning model 118b to the classification results (e.g., second anomaly score) of the first machine learning model 118a.

Figure 3:
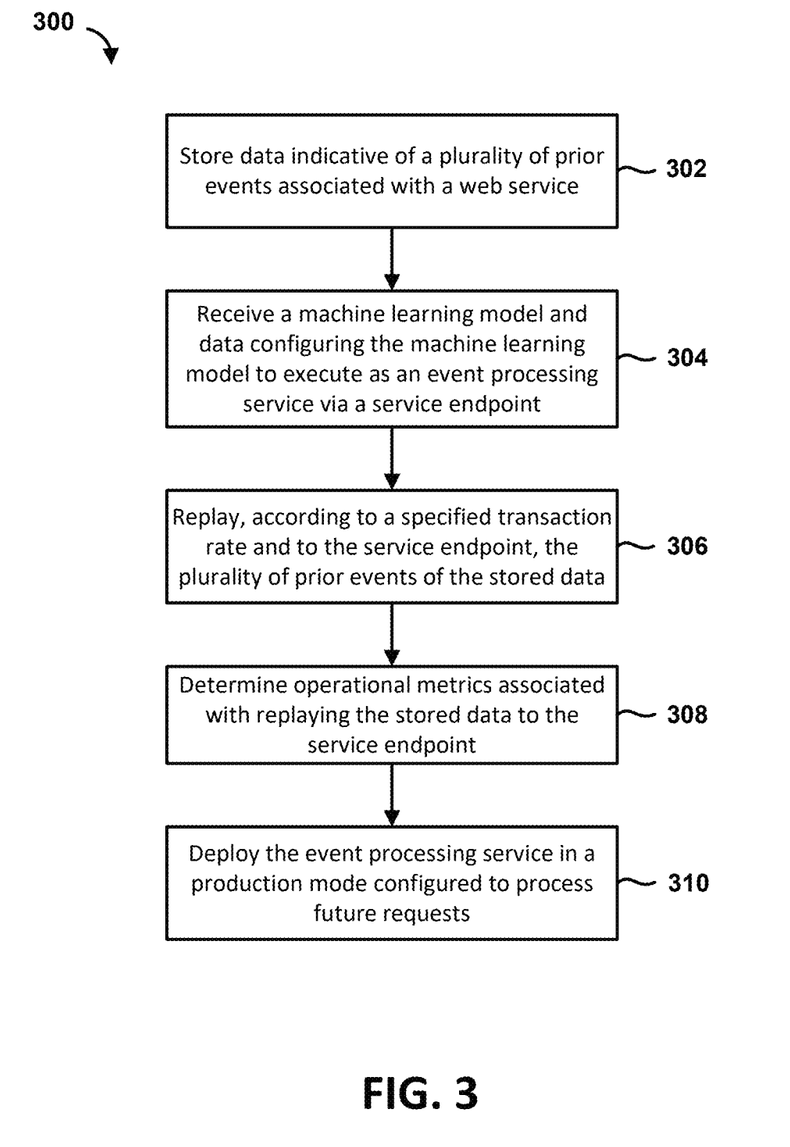
FIG. 3 is a flowchart showing an example process related to a machine learning model.

FIG. 3 is a flowchart showing an example process 300 for use in connection with the disclosed methods. The process 300 may comprise a computer implemented process for processing events using a machine learning model. A system and/or computing environment, such as the systems of FIGS. 1-2, the computing environment of FIG. 5, and/or the computing system of FIG. 6 may be configured to perform the process 300.

Operation 302 depicts storing data indicative of a plurality of prior events associated with a web service. The plurality of prior events may comprise requests for a resource of the web service, such as a request to sign-in, authentication request, a request for data, uploading of data, a combination thereof, and/or the like. The plurality of prior events may be events that were previously classified based on one or more of heuristic rules or a prior machine learning model.

Operation 304 depicts receiving, based on input via a user interface, a machine learning model and data configuring the machine learning model to execute as an event processing service via a service endpoint. The machine learning model may be initially configured to execute in a non-production mode. In embodiments, the event processing service is configured to receive event characteristics associated with a corresponding prior event and determine, based on the event characteristics, a classification of the prior event. The user interface may be configured to allow users to deploy machine learning models and integrate the machine learning models with a plurality of web services.

Operation 306 depicts replaying, according to a specified transaction rate and to the service endpoint, the plurality of prior events of the stored data. The service endpoint may cause the machine learning model to execute the plurality of prior events based on the specified transaction rate. The specified transaction rate may comprise an event rate, rate of sending requests to process events to the machine learning model and/or service endpoint, and/or the like. The specified transaction rate may be a user specified transaction rate. In some scenarios, the transaction rate may be based on a transaction rate associated with the web service, and/or a prior benchmark (e.g., current machine learning model, a heuristic rule based process).

Operation 308 depicts determining operational metrics associated with replaying the stored data to the service endpoint. The operational metrics may indicate system performance information in replaying the plurality of prior events. The system usage information may comprise system usage information, resource usage information, timing information, bandwidth information, efficiency information, or a combination thereof. The operational metrics may comprise information related to different system processes, such as transmitting data between services, using processing resources, using storage resources, power consumption, and/or the like. In embodiments, the operational metrics comprise one or more of latency, throughput, number of invocations of the machine learning model, number of errors, type of errors, availability, or a combination thereof.

Operation 310 depicts deploying, after determining that the operational metrics satisfy one or more deployment conditions, the event processing service in a production mode configured to process future requests. In production mode, the event processing service may be used to process requests from customers. As an example, the event processing service may classify events associated with customer events. The classification may cause the web service to respond to customer events in different manner. For example, if an authentication request is determined by the machine learning model to have low trustworthiness, additional authentication information may be required from the customer to complete authentication.

In embodiments, a triggering condition associated with the event processing service may be detected. A change in configuration of the event processing service may be caused based on the triggering condition. Changing the configuration of the event processing service may comprise changing the machine learning model from a production mode to a non-production model, reverting to a prior configuration before the machine learning model was deployed, a combination thereof, and/or the like. A change in a testing operation and/or replaying the plurality of prior events of the stored data may be caused based on the triggering condition. The specified transaction rate, a data size, a data length, a combination thereof, and/or the like may be changed based on the triggering condition. The triggering condition may comprise an accuracy of the machine learning model falling below a threshold, an operational metric no longer satisfying a deployment condition, or a combination thereof.

Figure 4:
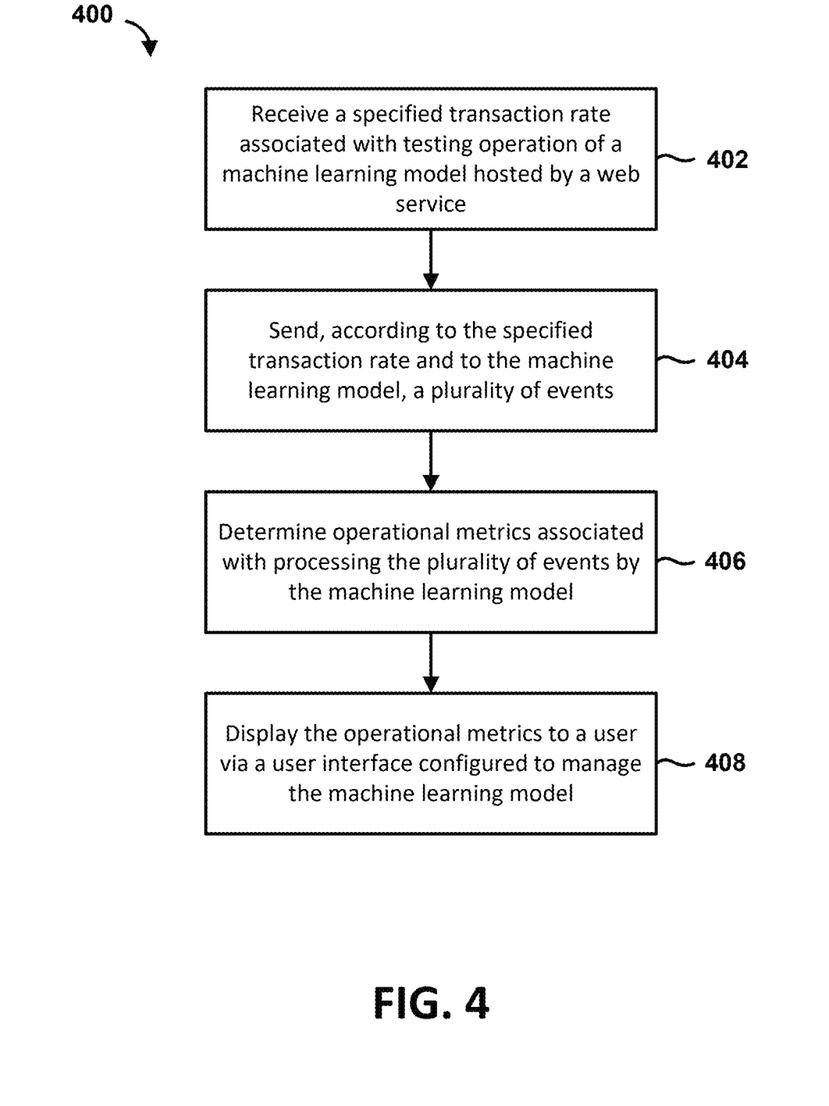
FIG. 4 is a flowchart showing an example process related to a machine learning model.

FIG. 4 is a flowchart showing an example process 400 for use in connection with the disclosed methods. The process 400 may comprise a computer implemented process for processing events using a machine learning model. A system and/or computing environment, such as the systems of FIGS. 1-2, the computing environment of FIG. 5, and/or the computing system of FIG. 6 may be configured to perform the process 400.

Operation 402 depicts receiving a specified transaction rate associated with testing operation of a machine learning model hosted by a web service. Data comprising the machine learning model may be received. Data configuring the machine learning model to execute as an event processing service via a service endpoint may be received. The machine learning model may be initially configured to execute in a non-production mode. In embodiments, the data comprising the machine learning model and/or the data configuring the machine learning model may be received via a user interface. In embodiments, the machine learning model is configured to receive event characteristics associated with a corresponding event and determine, based on the event characteristics, a classification of the event. An event may comprise any event detected, generated, and/or received by the web service. An example event comprises a request associated with a user, such as an authentication request. Example event characteristics comprise a network identifier (e.g., internet protocol address), location associated with request, browser identifier (e.g., or fingerprint), device identifier, a time associated with the request, and/or the like. The machine learning model may be trained to classify the event as low risk, high risk, and/or any other relevant category.

The user interface may allow users to upload a machine learning model, create a machine learning model, train the machine learning model, modify the machine learning model, and/or the like. In embodiments, the user interface allows users to integrate a machine learning model with a plurality of web services, such as the hosted web service. The hosted web service may be configured to send requests to the machine learning model (e.g., if the machine learning model is deployed in production mode).

The specified transaction rate may be received from the user via the user interface. In embodiments, the user interface is configured to allow users to deploy and/or test machine learning models. An association of the machine learning model with the plurality of events may be received (e.g., via the user interface). The user interface may allow users to performing a testing operation on the machine learning model. The testing operation may be configured by setting the specified transaction rate. An indication (e.g., selection) to apply the plurality of events to the machine learning model may be provided by the user. The indication may comprise selection of the events from a data store, specifying criteria for selection of the events, specifying criteria for modifying the events, and/or the like.

Operation 404 depicts sending, according to the specified transaction rate and to the machine learning model, a plurality of events. Sending the plurality of events may comprise sending the plurality of events in a time order associated with the plurality of events. The events may comprise prior events associated the web service stored in a data store. The testing operation may access the events and send the copies of the events and/or associated event characteristics to a service endpoint configured to input the events and/or event characteristics into the machine learning model. The events may be generated and/or modified according to a pattern. The pattern may be based on prior events and/or generated based on an algorithm. The stored events may be selectively sent by omitting and/or duplicating events to satisfy the transaction rate.

Operation 406 depicts determining operational metrics associated with processing the plurality of events by the machine learning model. The operational metrics may indicate system performance information in processing the plurality of events. The system performance information may comprise system usage information, resource usage information, timing information, bandwidth information, efficiency information, or a combination thereof. The operational metrics may comprise information related to different system processes, such as transmitting data between services, using processing resources, using storage resources, power consumption, and/or the like. In embodiments, the operational metrics comprise one or more of latency, throughput, number of invocations of the machine learning model, number of errors, type of errors, availability, or a combination thereof.

Operation 408 depicts displaying the operational metrics to a user via a user interface configured to manage the machine learning model. The operational metrics may be displayed with benchmark information. The benchmark information may be operational metrics associated with another machine learning model, such as a machine learning model currently used in production mode with the web service. The benchmark information may be operational metrics associated with another process, such as a heuristics rule based process. The benchmark information may comprise operational metrics associated with a prior testing operation on the machine learning model, such as a prior testing operation associated with a different transaction rate.

The machine learning model may be deployed in a production mode configured to process future events associated with an additional web service. The machine learning model may replace another process (e.g., heuristic process, another machine learning model) associated with the web service. The machine learning model may be deploy based on a user providing an indication to deploy the machine learning model. The machine learning model may be deployed based on, in response to, and/or after determining the operational metrics. A triggering condition associated with the operational metrics may be detected. One or more of the operational metrics or results of the machine learning model may be compared with benchmark information. The result of the comparison may be compared to one or more triggering conditions to detect the triggering condition.

An action may be caused and/or performed based on the triggering condition. The action may comprise sending a notification (e.g., via the user interface, via email), changing a configuration of the machine learning model, changing a parameter of the testing operation, a combination thereof, and/or the like. Changing the configuration of the machine learning model may comprise changing the machine learning model to production mode, changing the machine learning model to non-production mode, reverting back to a prior configuration, a combination thereof, and/or the like. Changing the parameter of the testing operation may comprise changing the specified transaction rate, a data length of the plurality of events, a data size the plurality of events, a data pattern of the testing operation, a combination thereof, and/or the like.

Figure 5:
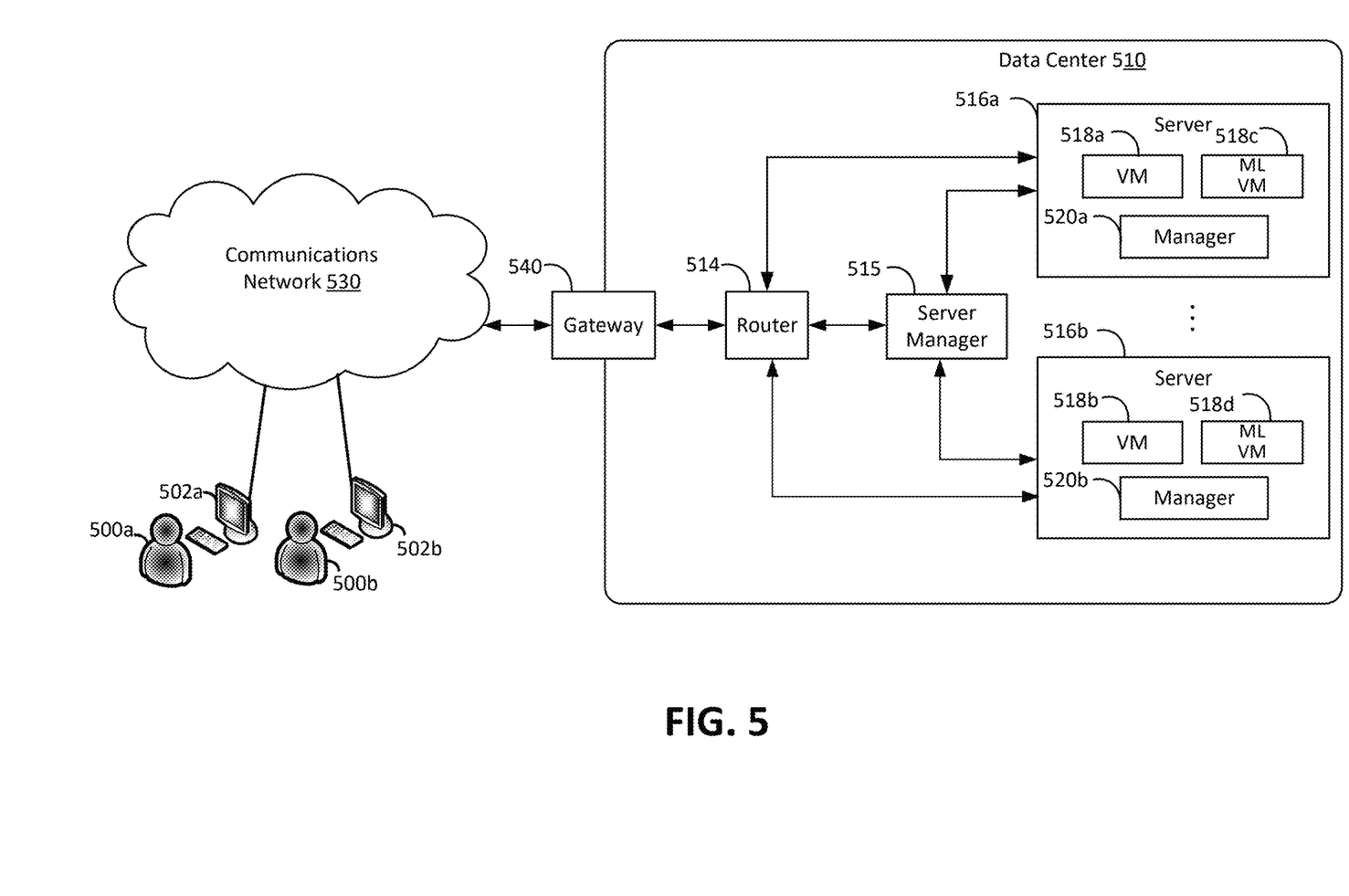
FIG. 5 is a diagram illustrating an example computing system that may be used in some embodiments.

FIG. 5 illustrates an example computing environment in which the embodiments described herein may be implemented. The example computing environment of FIG. 5 may be configured to implement one or more services, such as the computing service 102, the application service 104, the analysis service 106, the machine learning service 107, the storage service 108, or a combination thereof of FIGS. 1-2. The example computing environment of FIG. 5 may be configured to implement the production region 202, the pre-production region 204, the data stream service 206, the classification service 208, or a combination thereof of FIG. 2. The example computing environment of FIG. 5 may be configured to implement any of the methods described herein, such as any methods (e.g., or any operations) associated with FIGS. 1-4.

FIG. 5 is a diagram schematically illustrating an example of a data center 510 that can provide computing resources to users 500a and 500b (which may be referred herein singularly as user 500 or in the plural as users 500) via user computers 502a and 502b (which may be referred herein singularly as computer 502 or in the plural as computers 502) via a communications network 530. Data center 510 may be configured to provide computing resources for executing applications on a permanent or an as-needed basis. The computing resources provided by data center 510 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be general-purpose or may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These web services may be configurable with set or custom applications and may be configurable in size, execution, cost, latency, type, duration, accessibility, and in any other dimension. These web services may be configured as available infrastructure for one or more clients and can include one or more applications configured as a service or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols such as transmission control protocol (TCP) and less reliable transport layer protocols such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 510 may include servers 516a-b (which may be referred herein singularly as server 516 or in the plural as servers 516) that provide computing resources. These resources may be available as bare metal resources, or as virtual machine instances 518a-d and (which may be referred herein singularly as virtual machine instance 518 or in the plural as virtual machine instances 518). Virtual machine instances 518c and 518d are machine learning (ML) (e.g., ML hosting, ML analysis, ML testing) virtual machine instances. The ML virtual machine instances 518c and 518d may be configured to perform all or any portion of the machine learning deployment and testing techniques based on areas of interest in accordance with the present disclosure and described in detail below. As should be appreciated, while the particular example illustrated in FIG. 5 includes one ML virtual machine in each server, this is merely an example. A server may include more than one ML virtual machine or may not include any ML virtual machines.

The availability of virtualization technologies for computing hardware has provided benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 5, communications network 530 may, for example, be a publicly accessible network of linked networks and possibly operated by various distinct parties, such as the Internet. In other embodiments, communications network 530 may be a private network, such as, a corporate or university network that is wholly or partially inaccessible to non-privileged users. In still other embodiments, communications network 530 may include one or more private networks with access to and/or from the Internet.

Communication network 530 may provide access to computers 502. User computers 502 may be computers utilized by users 500 or other customers of data center 510. For instance, user computer 502a or 502b may be a server, a desktop or laptop personal computer, a tablet computer, a wireless telephone, a personal digital assistant (PDA), an e-book reader, a game console, a set-top box or any other computing device capable of accessing data center 510. User computer 502a or 502b may connect directly to the Internet (e.g., via a cable modem or a Digital Subscriber Line (DSL)). Although only two user computers 502a and 502b are depicted, it should be appreciated that there may be multiple user computers.

User computers 502 may also be utilized to configure aspects of the computing resources provided by data center 510. In this regard, data center 510 might provide a gateway or web interface through which aspects of its operation may be configured through the use of a web browser application program executing on user computer 502. Alternately, a stand-alone application program executing on user computer 502 might access an application programming interface (API) exposed by data center 510 for performing the configuration operations. Other mechanisms for configuring the operation of various web services available at data center 510 might also be utilized.

Servers 516 shown in FIG. 5 may be standard servers configured appropriately for providing the computing resources described above and may provide computing resources for executing one or more web services and/or applications. In one embodiment, the computing resources may be virtual machine instances 518. In the example of virtual machine instances, each of the servers 516 may be configured to execute an instance manager 520a or 520b (which may be referred herein singularly as instance manager 520 or in the plural as instance managers 520) capable of executing the virtual machine instances 518. The instance managers 520 may be a virtual machine monitor (VMM) or another type of program configured to enable the execution of virtual machine instances 518 on server 516, for example. As discussed above, each of the virtual machine instances 518 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 510 shown in FIG. 5, a router 514 may be utilized to interconnect the servers 516a and 516b. Router 514 may also be connected to gateway 540, which is connected to communications network 530. Router 514 may be connected to one or more load balancers, and alone or in combination may manage communications within networks in data center 510, for example by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 510 shown in FIG. 5, a server manager 515 is also employed to at least in part direct various communications to, from and/or between servers 516a and 516b. While FIG. 5 depicts router 514 positioned between gateway 540 and server manager 515, this is merely an exemplary configuration. In some cases, for example, server manager 515 may be positioned between gateway 540 and router 514. Server manager 515 may, in some cases, examine portions of incoming communications from user computers 502 to determine one or more appropriate servers 516 to receive and/or process the incoming communications. Server manager 515 may determine appropriate servers to receive and/or process the incoming communications based on factors such as an identity, location or other attributes associated with user computers 502, a nature of a task with which the communications are associated, a priority of a task with which the communications are associated, a duration of a task with which the communications are associated, a size and/or estimated resource usage of a task with which the communications are associated and many other factors. Server manager 515 may, for example, collect or otherwise have access to state information and other information associated with various tasks in order to, for example, assist in managing communications and other operations associated with such tasks.

It should be appreciated that the network topology illustrated in FIG. 5 has been greatly simplified and that many more networks and networking devices may be utilized to interconnect the various computing systems disclosed herein. These network topologies and devices should be apparent to those skilled in the art.

It should also be appreciated that data center 510 described in FIG. 5 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 6:
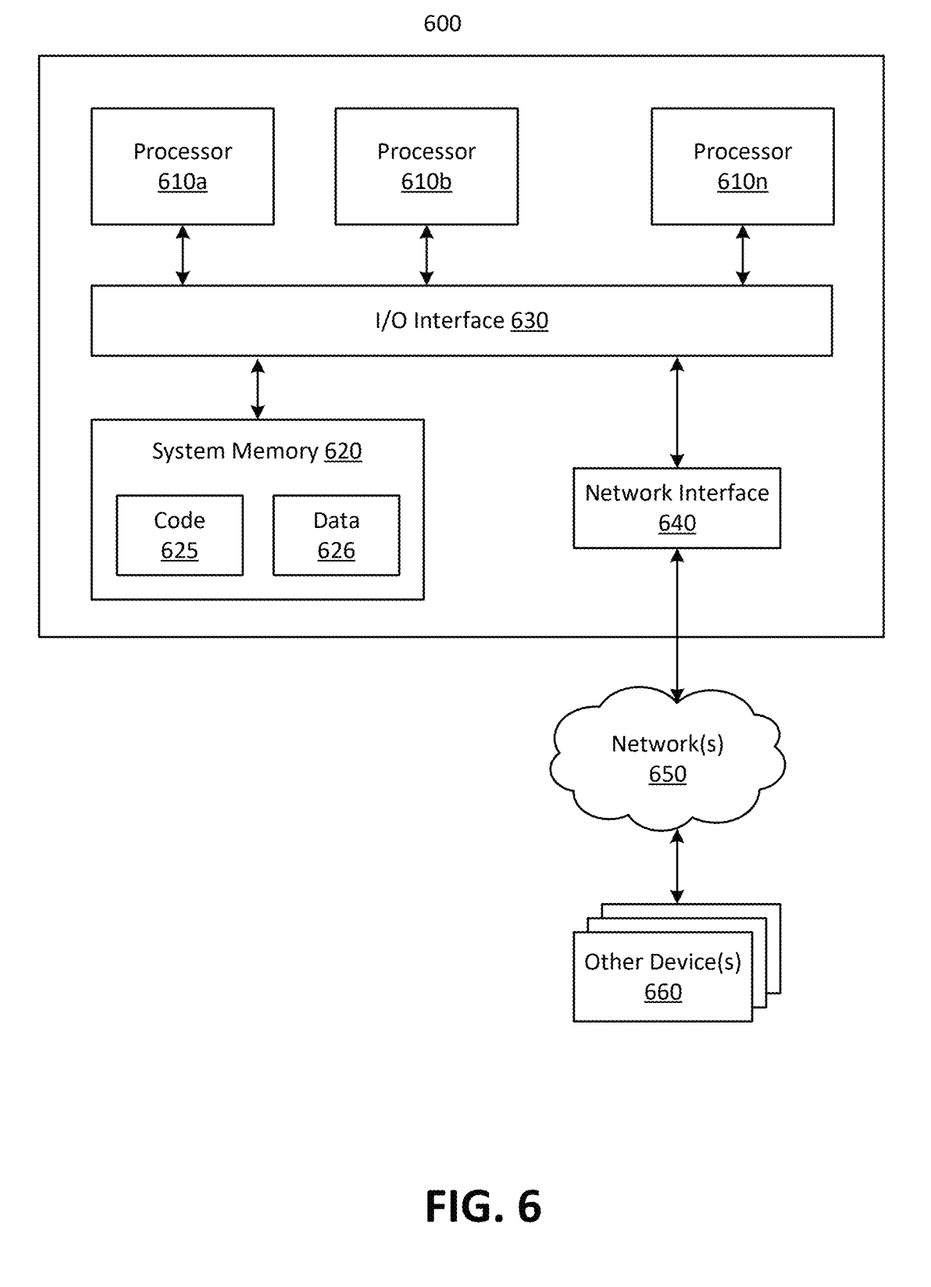
FIG. 6 is a diagram illustrating an example computing system that may be used in some embodiments.

In at least some embodiments, a server that implements a portion or all of one or more of the technologies described herein may include a general-purpose computer system that includes or is configured to access one or more computer-accessible media. FIG. 6 depicts a general-purpose computer system that includes or is configured to access one or more computer-accessible media. The example computer system of FIG. 6 may be configured to implement one or more of the computing service 102, the application service 104, the analysis service 106, the machine learning service 107, the storage service 108, the user device 110, or a combination thereof of FIGS. 1-2. The example computer system of FIG. 6 may be configured to implement production region 202 (e.g., any device therein), the pre-production region 204 (e.g., any device therein), the data stream service 206, the classification service 208, or a combination thereof of FIG. 2. The example computer system of FIG. 6 may be configured to implement any of the methods described herein, such as any methods (e.g., or any operations) associated with FIGS. 1-4.

In the illustrated embodiment, computing device 600 includes one or more processors 610a, 610b and/or 610n (which may be referred herein singularly as "a processor 610" or in the plural as "the processors 610") coupled to a system memory 620 via an input/output (I/O) interface 630. Computing device 6100 further includes a network interface 640 coupled to I/O interface 630.

In various embodiments, computing device 600 may be a uniprocessor system including one processor 610 or a multiprocessor system including several processors 610 (e.g., two, four, eight or another suitable number). Processors 610 may be any suitable processors capable of executing instructions. For example, in various embodiments, processors 610 may be general-purpose or embedded processors implementing any of a variety of instruction set architectures (ISAs), such as the x86, PowerPC, SPARC or MIPS ISAs or any other suitable ISA. In multiprocessor systems, each of processors 610 may commonly, but not necessarily, implement the same ISA.

System memory 620 may be configured to store instructions and data accessible by processor(s) 610. In various embodiments, system memory 620 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 620 as code 625 and data 626.

In one embodiment, I/O interface 630 may be configured to coordinate I/O traffic between processor 610, system memory 620 and any peripherals in the device, including network interface 640 or other peripheral interfaces. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computing device 600 and other device or devices 660 attached to a network or networks 650, such as other computer systems or devices, for example. In various embodiments, network interface 640 may support communication via any suitable wired or wireless general data networks, such as types of Ethernet networks, for example. Additionally, network interface 40 may support communication via telecommunications/telephony networks such as analog voice networks or digital fiber communications networks, via storage area networks such as Fibre Channel SANs (storage area networks) or via any other suitable type of network and/or protocol.

In some embodiments, system memory 620 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 600 via I/O interface 60. A non-transitory computer-accessible storage medium may also include any volatile or non-volatile media such as RAM (e.g. SDRAM, DDR SDRAM, RDRAM, SRAM, etc.), ROM (read only memory)

etc., that may be included in some embodiments of computing device 600 as system memory 60 or another type of memory. Further, a computer-accessible medium may include transmission media or signals such as electrical, electromagnetic or digital signals conveyed via a communication medium such as a network and/or a wireless link, such as those that may be implemented via network interface 60. Portions or all of multiple computing devices such as those illustrated in FIG. 5 may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A network set up by an entity such as a company or a public sector organization to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer implemented method, the method comprising:
    storing data indicative of a plurality of prior events associated with an application operating on a web service;
    receiving, based on input via a user interface, a trained machine learning model and data configuring the machine learning model to execute as an event processing service via a service endpoint, wherein the machine learning model is initially configured to execute in a non-production mode;
    replaying, according to a specified transaction rate and to the service endpoint, the plurality of prior events of the stored data, wherein the service endpoint causes the machine learning model to execute the plurality of prior events based on the specified transaction rate, wherein the specified transaction rate comprises a rate of time different from the rate of time of the prior events;
    determining operational metrics associated with replaying the stored data to the service endpoint, wherein the operational metrics indicate system performance information in replaying the plurality of prior events; and
    deploying, after determining that the operational metrics satisfy one or more deployment conditions, the event processing service in a production mode configured to process future requests.

2. The method of claim 1, wherein the event processing service is configured to receive event characteristics associated with a corresponding prior event and determine, based on the event characteristics, a classification of the prior event.

3. The method of claim 1, wherein the operational metrics comprises one or more of latency, throughput, number of invocations of the machine learning model, number of errors, or availability.

4. The method of claim 1, further comprising detecting a triggering condition associated with the event processing service and causing, based on the triggering condition, a change in one or more of a configuration of the event processing service, the specified transaction rate, or a testing parameter of the replaying the plurality of prior events of the stored data.

5. The method of claim 1, wherein the user interface is configured to allow users to deploy machine learning models and integrate the machine learning models with a plurality of web services.

6. A system comprising one or more memories having instructions thereon that, upon execution by one or more processors of the system, at least cause the system to:
receive a specified transaction rate associated with testing operation of a machine learning model hosted by a web service based on data indicative of a plurality of prior events associated with an application operating on a web service, wherein the specified transaction rate comprises a rate of time independent of the rate of time of the prior events;
send, according to the specified transaction rate and to the machine learning model, a plurality of events;
determine operational metrics associated with processing the plurality of events by the machine learning model, wherein the operational metrics indicate system performance information in processing the plurality of events; and
display the operational metrics to a user via a user interface configured to manage the machine learning model.

7. The system of claim 6, wherein the machine learning model is configured to receive event characteristics associated with a corresponding event and determine, based on the event characteristics, a classification of the event.

8. The system of claim 6, wherein the operational metrics comprises one or more of latency, throughput, number of invocations of the machine learning model, number of errors, or availability.

9. The system of claim 6, wherein the instructions, upon execution by one or more processors of the system, further cause the system to detect a triggering condition associated with the operational metrics and cause, based on the triggering condition, one or more of sending of a notification, changing a parameter of the testing operation, or changing a configuration of the machine learning model.

10. The system of claim 6, wherein the user interface is configured to allow users to deploy machine learning models and integrate the machine learning models with a plurality of web services.

11. The system of claim 6, wherein the instructions, upon execution by one or more processors of the system, further cause the system to receive an association of the machine learning model with the plurality of events.

12. The system of claim 6, wherein the instructions, upon execution by one or more processors of the system, further cause the system to receive, based on input from a user, data comprising the machine learning model and data configuring the machine learning model to execute as an event processing service via a service endpoint, wherein the machine learning model is initially configured to execute in a non-production mode.

13. The system of claim 6, wherein the instructions, upon execution by one or more processors of the system, further cause the system to deploy, after determining the operational metrics, the machine learning model in a production mode configured to process future events associated with an additional web service.

14. The system of claim 6, wherein the instructions, upon execution by one or more processors of the system, further cause the system to compare one or more of the operational metrics or results of the machine learning model with benchmark information.

15. A non-transitory computer-readable storage medium having stored thereon computer-readable instructions, the computer-readable instructions comprising instructions that, upon execution on one or more computing devices, at least cause:
receiving a specified transaction rate associated with testing operation of a machine learning model hosted by a web service;
sending, according to the specified transaction rate and to the machine learning model, a plurality of events;
determining operational metrics associated with processing the plurality of events by the machine learning model, wherein the operational metrics indicate system performance information in processing the plurality of events; and
displaying the operational metrics to a user via a user interface configured to manage the machine learning model.

16. The computer-readable storage medium of claim 15, wherein the machine learning model is configured to receive event characteristics associated with a corresponding event and determine, based on the event characteristics, a classification of the event.

17. The computer-readable storage medium of claim 15, wherein the operational metrics comprises one or more of latency, throughput, number of invocations of the machine learning model, number of errors, or availability.

18. The computer-readable storage medium of claim 15, wherein the instructions, upon execution on one or more computing devices, further cause detecting a triggering condition associated with the operational metrics and causing, based on the triggering condition, one or more of sending of a notification or changing a configuration of the machine learning model.

19. The computer-readable storage medium of claim 15, wherein the user interface is configured to allow users to deploy machine learning models and integrate the machine learning models with a plurality of web services.

20. The computer-readable storage medium of claim 15, wherein the instructions, upon execution on one or more computing devices, further cause receiving an association of the machine learning model with the plurality of events.

* * * * *